(12) United States Patent
Kennedy et al.

(10) Patent No.: US 12,045,351 B2
(45) Date of Patent: Jul. 23, 2024

(54) SYSTEM AND METHOD OF AUTHENTICATING FIRMWARE

(71) Applicant: Dell Products L.P., Round Rock, TX (US)

(72) Inventors: Jeffrey Leighton Kennedy, Austin, TX (US); Milton Olavo Taveira, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 16/857,518

(22) Filed: Apr. 24, 2020

(65) Prior Publication Data

US 2021/0334378 A1 Oct. 28, 2021

(51) Int. Cl.
| | |
|---|---|
| *G06F 21/57* | (2013.01) |
| *G06F 13/36* | (2006.01) |
| *G06F 21/76* | (2013.01) |
| *H04L 9/30* | (2006.01) |
| *H04L 9/32* | (2006.01) |

(52) U.S. Cl.
CPC ............ *G06F 21/572* (2013.01); *G06F 13/36* (2013.01); *G06F 21/575* (2013.01); *G06F 21/76* (2013.01); *H04L 9/30* (2013.01); *H04L 9/3236* (2013.01); *H04L 9/3247* (2013.01); *G06F 2221/033* (2013.01)

(58) Field of Classification Search
CPC ...... G06F 21/57; G06F 21/572; G06F 21/575; G06F 21/71; G06F 21/76; G06F 13/36; G06F 2221/033; H04L 9/30; H04L 9/3236; H04L 9/3247
See application file for complete search history.

(56) References Cited

U.S. PATENT DOCUMENTS

| | | | |
|---|---|---|---|
| 4,995,082 A | 2/1991 | Schnorr | |
| 5,231,668 A | 7/1993 | Kravitz | |
| 10,303,883 B2* | 5/2019 | Dasari | ................... G06F 21/572 |
| 2008/0045342 A1* | 2/2008 | Crowder, Jr. | ......... G06F 9/4403 717/176 |
| 2016/0147996 A1* | 5/2016 | Martinez | ............... H04L 9/0877 713/171 |
| 2018/0004953 A1* | 1/2018 | Smith, II | ............... H04L 9/3268 |
| 2019/0042229 A1* | 2/2019 | Kotary | ...................... G06F 8/65 |
| 2019/0073478 A1* | 3/2019 | Khessib | ............... G06F 13/4282 |
| 2020/0097659 A1* | 3/2020 | Olarig | ................... H04L 63/062 |
| 2020/0356380 A1* | 11/2020 | Kelly | .................. G06F 11/3051 |

\* cited by examiner

*Primary Examiner* — D'Arcy Winston Straub
(74) *Attorney, Agent, or Firm* — McDermott Will & Emery LLP

(57) ABSTRACT

In one or more embodiments, one or more systems, one or more methods, and/or one or more processes may: receive firmware of an integrated circuit (IC) of an information handling system; receive a digital signature of the firmware, where the digital signature includes an encrypted hash value, encrypted with a private encryption key; determine a first hash value of the firmware; decrypt the encrypted hash value, via a public encryption key associated with the private encryption key, to obtain a second hash value; determine if the first hash value matches the second hash value; if so, permit the information handling system to boot an operating system; and if not, prevent, by the authentication device, the information handling system from booting the operating system.

20 Claims, 7 Drawing Sheets

SYSTEM AND METHOD OF AUTHENTICATING FIRMWARE

BACKGROUND

Field of the Disclosure

This disclosure relates generally to information handling systems and more particularly to authenticating firmware.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may access, by an authentication device of an information handling system, a memory medium that stores firmware of an integrated circuit (IC) of the information handling system to obtain the firmware from the memory medium; may receive, by the authentication device, the firmware; may access, by the authentication device, the memory medium to obtain a digital signature of the firmware, where the digital signature includes an encrypted hash value, encrypted via an asymmetric encryption process with a private encryption key; may receive, by the authentication device, the digital signature of the firmware; may determine, by the authentication device, a first hash value of the firmware; may decrypt, by the authentication device, the encrypted hash value, via the asymmetric encryption process with a public encryption key associated with the private encryption key, to obtain a second hash value; may determine, by the authentication device, if the first hash value matches the second hash value; if the first hash value matches the second hash value, may permit, by the authentication device, the information handling system to boot an operating system; and if the first hash value does not match the second hash value, may prevent, by the authentication device, the information handling system from booting the operating system.

In one or more embodiments, the IC may include a field programmable gate array (FPGA) or a complex programmable logic device (CPLD), among others. In one or more embodiments, the authentication device may include a processor of the information handling system, a platform controller hub of the information handling system, a baseboard management controller of the information handling system, or a microcontroller of the information handling system. In one or more embodiments, the baseboard management controller or the microcontroller may store the public encryption key. For example, the authentication device may include the baseboard management controller or the microcontroller. In one or more embodiments, a non-volatile memory medium of the information handling system may store the public encryption key. For example, the authentication device may include the processor or the platform controller hub. In one or more embodiments, the one or more systems, the one or more methods, and/or the one or more processes may further: access, by the authentication device, the non-volatile memory medium of the information handling system to obtain the public encryption key; and receive, by the authentication device, the public encryption key from the non-volatile memory medium of the information handling system.

In one or more embodiments, receiving the firmware of the IC from the IC may include receiving the firmware via one or more direct couplings. In one or more embodiments, receiving the digital signature may include receiving the digital signature via the one or more direct couplings. In one or more embodiments, receiving the firmware of the IC from the IC may include receiving the firmware via a bus shared with at least one component of the information handling system other than the IC and the authentication device. In one or more embodiments, receiving the digital signature may include receiving the digital signature via the bus.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
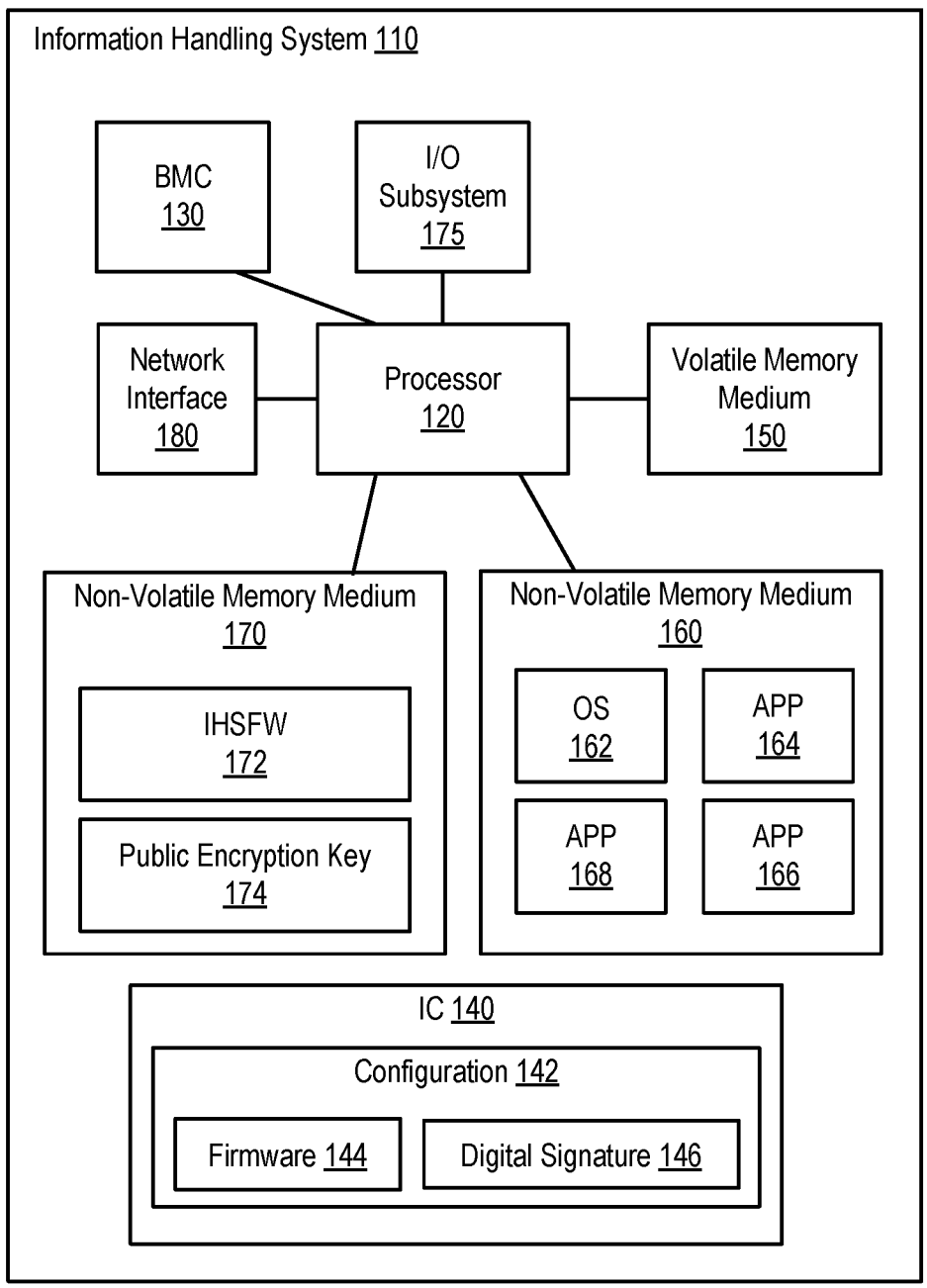
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, authentication of firmware of components of information handling systems may be important. If firmware of a component of an information handling system has been compromised, one or more insecure and/or hazardous elements may be introduced to the information handling system. In one example, a component of an information handling system may access and/or control information of the information handling system. In one instance, the component may be able to alter and/or corrupt the information of the information handling system. In another instance, the component may be able to transfer the information of the information handling system to a removable memory medium and/or to a network, when the uncompromised firmware of the component would otherwise not enable or not permit these actions. In another example, the component may orchestrate one or more of power a sequence, orchestrate power a boot sequence, control a reset, fault aggregation, error handling, a voltage regulator, and power controls, among others. In one or more embodiments, if the component utilizes compromised firmware, the component may cause one or more issues. For example, the one or more issues may include a denial of service, rendering the information handling system unusable, damaging the information handling system, bypassing security features, opening a security backdoor, among other negative consequences.

In one or more embodiments, authentication of firmware of a component of an information handling system may be implemented with a digital signature of the firmware. For example, before the component is programmed with the firmware, a hash value of the firmware may be determined. The hash value of the firmware may be encrypted with a private encryption key, associated with an asymmetric encryption process, to obtain a digital signature of the firmware. The component may be programmed with the firmware, and the digital signature of the firmware may be stored in the component.

In one or more embodiments, firmware stored by the component may be authenticated with the digital signature. For example, a first hash value of the firmware stored by the component may be determined. The digital signature may be retrieved from the component. The digital signature, retrieved from the component, may be decrypted with a public encryption key, associated with the asymmetric encryption process, to obtain a second hash value. If the first hash value matches the second hash value, the firmware stored by the component may be authenticated. If the first hash value does not match the second hash value, the firmware stored by the component may not be authenticated.

Turning now to FIG. 1, an example of an information handling system is illustrated, according to one or more embodiments. An information handling system (IHS) 110 may include a hardware resource or an aggregate of hardware resources operable to compute, process, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, an integrated circuit (IC) 140, a volatile memory medium 150, a non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, IC 140, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, IC 140, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, IC 140, an I/O subsystem 175 and a network interface 180 may be communicatively coupled to processor 120 via one or more PCIe switches.

In one or more embodiments, IC 140 may include a field programmable gate array (FPGA) or a complex programmable logic device (CPLD), among others. As illustrated, IC 140 may include a configuration 142. For example, configuration 142 may be installed on IC 140. As shown, configuration 142 may include firmware 144 and a digital signature 146. Digital signature 146 may be a digital signature of firmware 144. For example, digital signature 146 may include an encrypted hash value of firmware 144. In one or more embodiments, configuration 142 may include an image that includes firmware 144 and digital signature 146.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. As shown, non-volatile memory medium 170 may include a public encryption key 174. In one or more embodiments, an asymmetric cryptographic process may utilize public encryption key 174 to decrypt digital signature 146 to obtain a hash value of firmware 144.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2A:
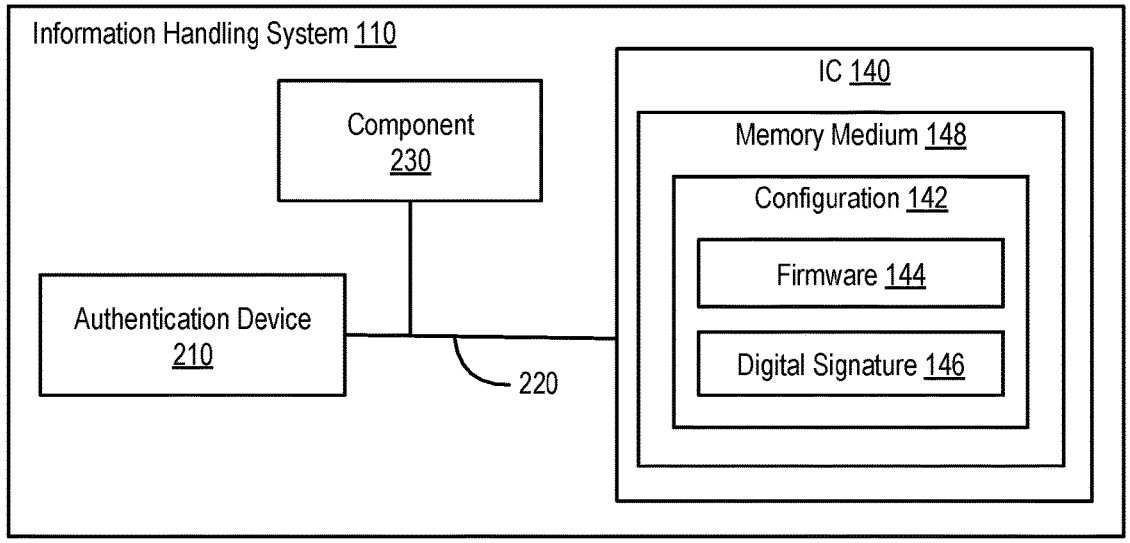
FIG. 2A illustrates a second example of an information handling system, according to one or more embodiments.

Turning now to FIG. 2A, a second example of an information handling system is illustrated, according to one or more embodiments. As shown, IHS 110 may include an authentication device 210 and a bus 220. In one or more embodiments, authentication device 210 may be configured in accordance with at least a portion of one or more systems, at least a portion of one or more flowcharts, one or more methods, and/or at least a portion of one or more processes described herein. As illustrated, authentication device 210 may be coupled to IC 140 via bus 220. A component 230 may be any component of IHS 110. For example, component 230 may be BMC 130, volatile memory medium 150, non-volatile memory medium 160, non-volatile memory medium 170, I/O subsystem 175, or network interface 180, among others. As shown, component 230 may be coupled to bus 220. For example, authentication device 210, IC 140, and component 230 may share bus 220.

As illustrated, IC 140 may include a memory medium 148. In one or more embodiments, memory medium 148 may include one or more structures and/or one or more functionalities of a memory medium described herein. For example, memory medium 148 may include at least one of a volatile memory medium and a non-volatile memory medium. As shown, memory medium 148 may store configuration 148. As illustrated, memory medium 148 may store firmware 144 and digital signature 146. In one or more embodiments, memory medium 148 may store firmware 144 via a first portion of memory medium 148, and memory medium 148 may store digital signature 146 via a second portion of memory medium 148. For example, the second portion of memory medium 148 may include a user portion of memory medium 148. In one or more embodiments, authentication device 210 may access memory medium 148 via bus 220. Authentication device 210 may receive firmware 144 and digital signature 146 from IC 140 via bus 220.

Figure 2B:
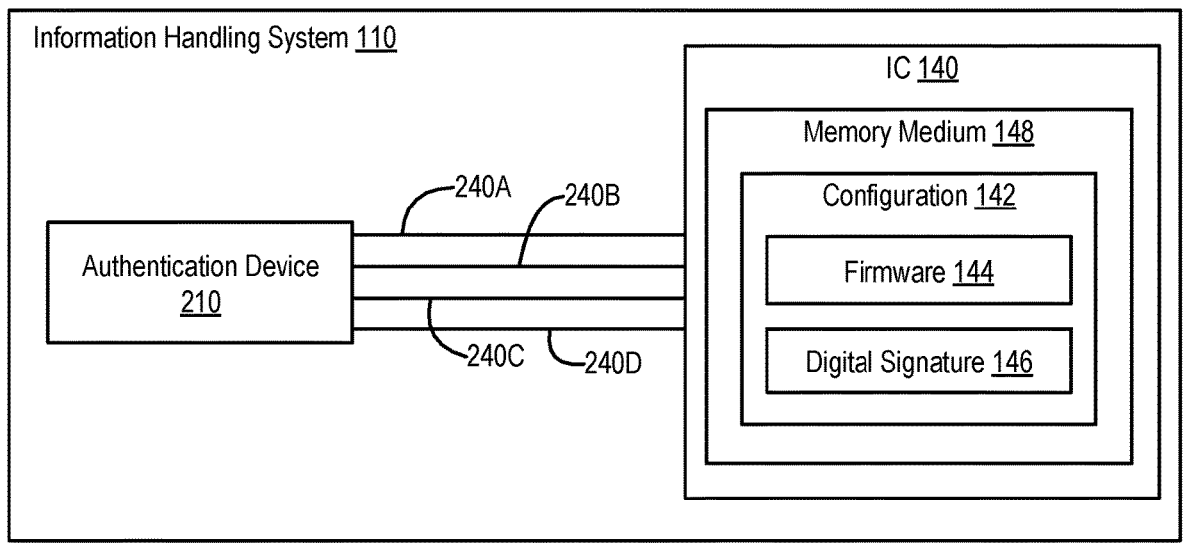
FIG. 2B illustrates a third example of an information handling system, according to one or more embodiments.

Turning now to FIG. 2B, a third example of an information handling system is illustrated, according to one or more embodiments. As shown, IHS 110 may include authentication device 210 and couplings 240A-240D. As illustrated, authentication device 210 may be coupled to IC 140 via couplings 240A-240D. For example, authentication device 210 may be directly coupled to IC 140. Authentication device 210 may be coupled to IC 140 without sharing a bus or a coupling with component 230. In one or more embodiments, authentication device 210 may access memory medium 148 via couplings 240A-240D. Authentication device 210 may receive firmware 144 and digital signature 146 via couplings 240A-240D. Although four couplings 240A-240D are illustrated, any one or more couplings 240 may be utilized, according to one or more embodiments.

Figure 2C:
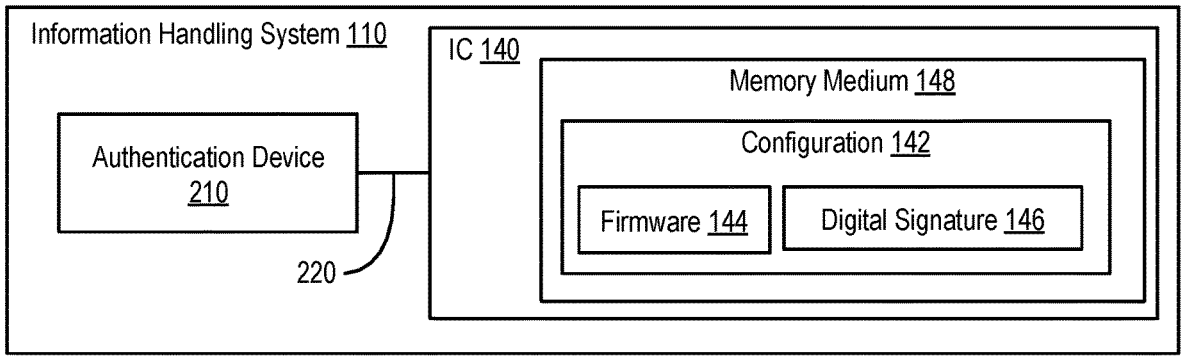
FIG. 2C illustrates a fourth example of an information handling system, according to one or more embodiments.

Turning now to FIG. 2C, a fourth example of an information handling system is illustrated, according to one or more embodiments. As shown, authentication device 210 may be coupled to IC 140 via bus 220. In one or more embodiments, authentication device 210 and IC 140 may not share bus 220 with any other component of IHS 110.

Figure 2D:
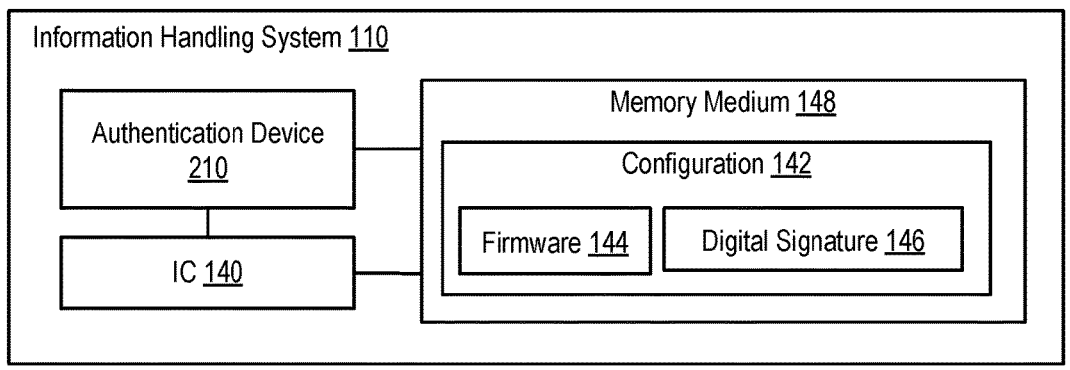
FIG. 2D illustrates a fifth example of an information handling system, according to one or more embodiments.

Turning now to FIG. 2D, a fifth example of an information handling system is illustrated, according to one or more embodiments. As shown, memory medium 148 may be external to IC 140. For example, IHS 110 may include memory medium 148. As illustrated, IC 140 may be coupled to memory medium 148. For example, IC 140 may receive firmware 144 from memory medium 148. As shown, authentication device 210 may be coupled to memory medium 148. In one or more embodiments, authentication device 210 may access memory medium 148. For example, authentication device 210 may receive firmware 144 and/or digital signature 146 from memory medium 148. For instance, authentication device 210 may receive firmware 144 and/or digital signature 146 from memory medium 148 without receiving firmware 144 and/or digital signature 146 from IC 140. Although three coupling are illustrated in FIG. 2D, IC 140, memory medium 148, and authentication device 210 may be coupled to one-another via a bus described herein, according to one or more embodiments.

Figure 2E:
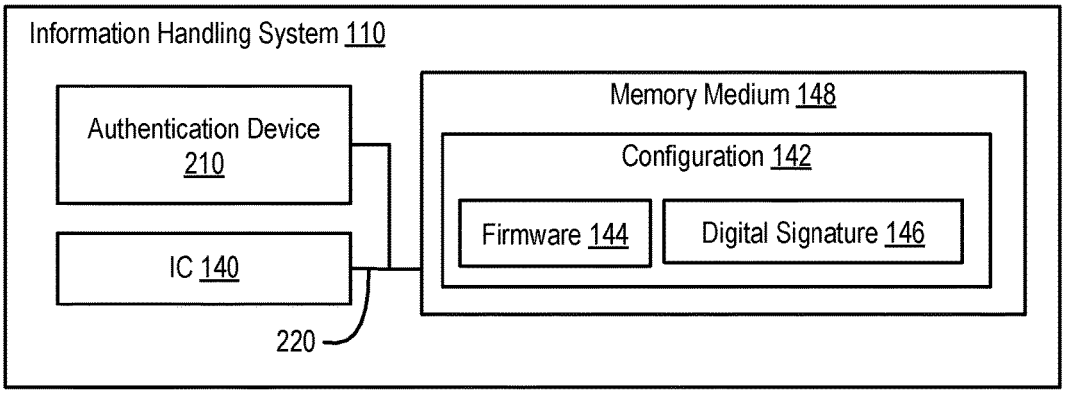
FIG. 2E illustrates another example of an information handling system, according to one or more embodiments.

Turning now to FIG. 2E, another example of an information handling system is illustrated, according to one or more embodiments. As shown, memory medium 148 may be external to IC 140. For example, IHS 110 may include memory medium 148. As illustrated, IC 140 may be coupled to memory medium 148 via bus 220. For example, IC 140 may receive firmware 144 from memory medium 148 via bus 220. As shown, authentication device 210 may be coupled to memory medium 148 via bus 220. In one or more embodiments, authentication device 210 may access memory medium 148 via bus 220. For example, authentication device 210 may receive firmware 144 and/or digital signature 146 from memory medium 148 via bus 220. For instance, authentication device 210 may receive firmware 144 and/or digital signature 146 from memory medium 148 without receiving firmware 144 and/or digital signature 146 from IC 140. In one or more embodiments, bus 220 may include one or more structures and/or functionalities of a bus described herein.

Figure 3A:
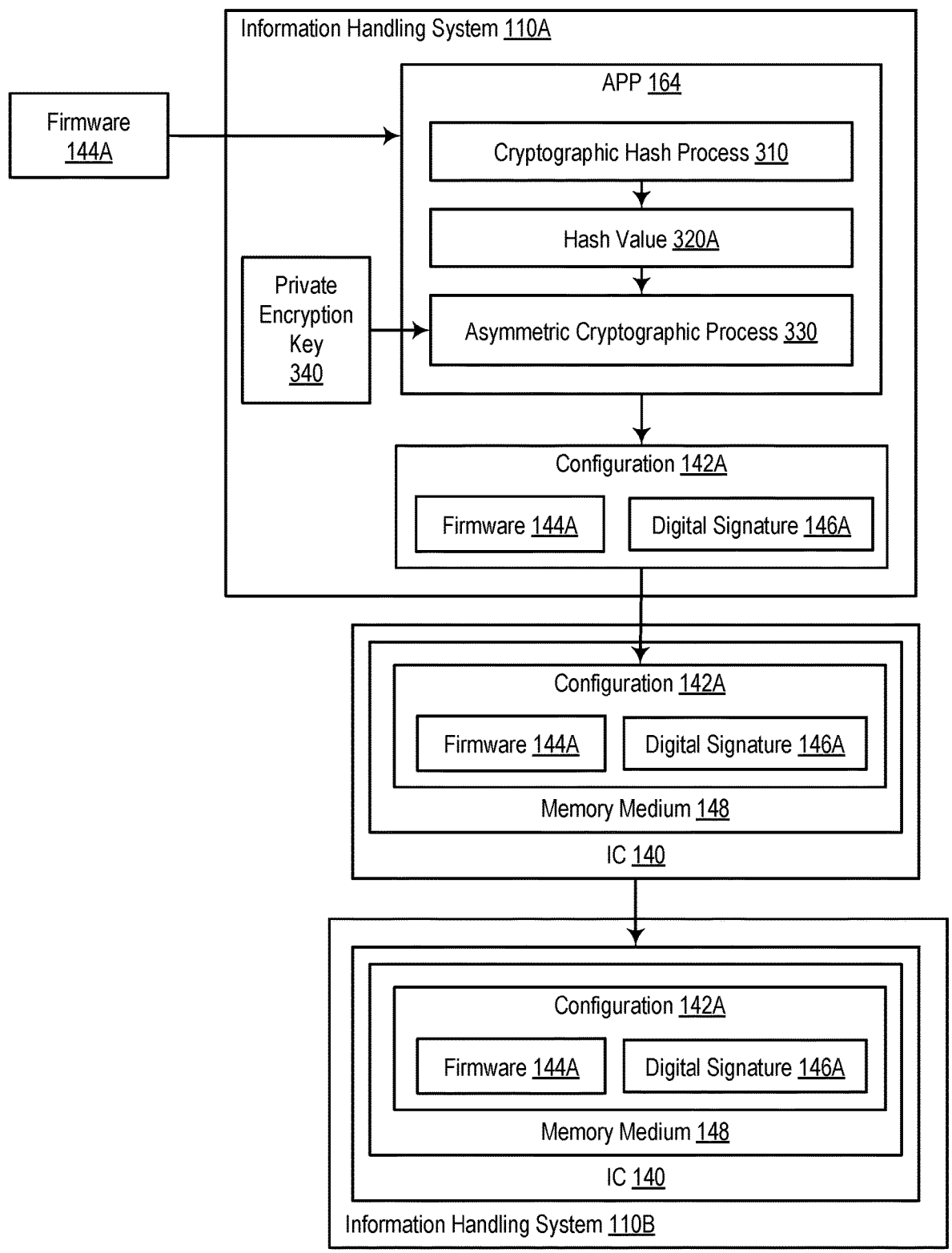
FIG. 3A illustrates an example of installing an integrated circuit in an information handling system, according to one or more embodiments.

Turning now to FIG. 3A, an example of installing an integrated circuit in an information handling system is illustrated, according to one or more embodiments. As shown, firmware 144A may be provided to APP 164 of an IHS 110A. As illustrated, APP 164 of IHS 110A may include a cryptographic hash process 310. Cryptographic hash process 310 may produce hash values from a one-way hash function.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or said to be strengthened.

In one or more embodiments, cryptographic hash process 310 may produce a hash value 320A based at least on firmware 144A. For example, cryptographic hash process 310 may utilize firmware 144A as input and may produce hash value 320A. As illustrated, APP 164 of IHS 110A may include an asymmetric cryptographic process 330. As shown, asymmetric cryptographic hash process 330 may utilize a private encryption key 340 and hash value 320A as input. Asymmetric cryptographic hash process 330 may produce digital signature 146A from private encryption key 340 and hash value 320A. As shown, APP 164 may produce configuration 142A, which may include firmware 144A and digital signature 146A. As illustrated, configuration 142A may be installed on IC 140. For example, configuration 142A may be installed in memory medium 148 of IC 140. Installing configuration 142A in memory medium 148 may include programming memory medium 148 with configuration 142A. As shown, IC 140 may be installed in an IHS 110B.

Figure 3B:
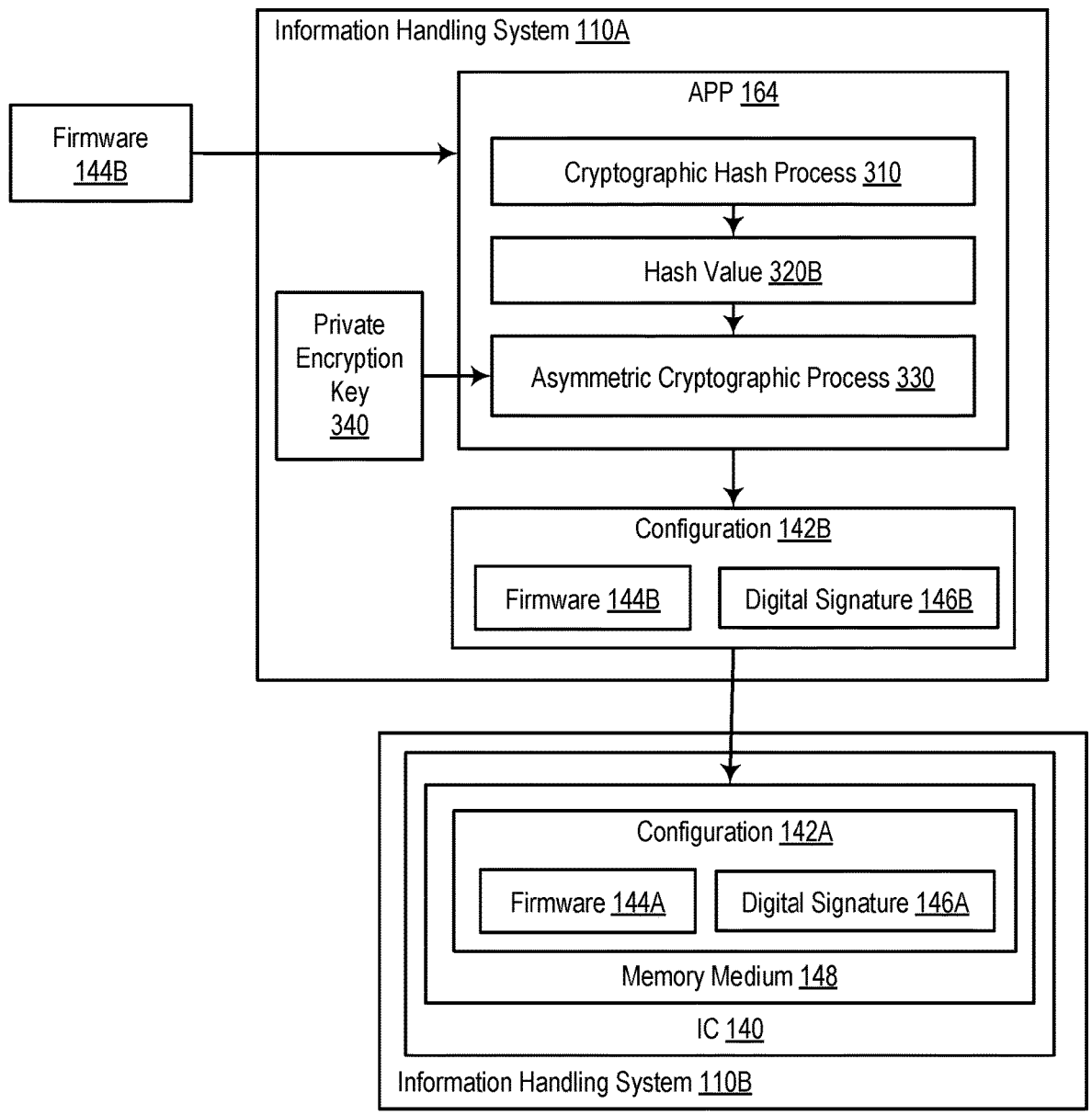
FIG. 3B illustrates an example of configuring an integrated circuit, according to one or more embodiments.

Turning now to FIG. 3B, an example of configuring an integrated circuit is illustrated, according to one or more embodiments. As shown, firmware 144B may be provided to APP 164 of IHS 110A. In one or more embodiments, cryptographic hash process 310 may produce a hash value 320B based at least on firmware 144B. For example, cryptographic hash process 310 may utilize firmware 144B as input and may produce hash value 320B. As illustrated, asymmetric cryptographic hash process 330 may utilize private encryption key 340 and hash value 320B as input. Asymmetric cryptographic hash process 330 may produce digital signature 146B from private encryption key 340 and hash value 320B. As shown, APP 164 may produce configuration 142B, which may include firmware 144B and digital signature 146B. As illustrated, configuration 142B may be installed on IC 140 of IHS 110B. For example, configuration 142B may be installed in memory medium 148 of IC 140. Installing configuration 142B in memory medium 148 may include programming memory medium 148 with configuration 142B.

Figure 3C:
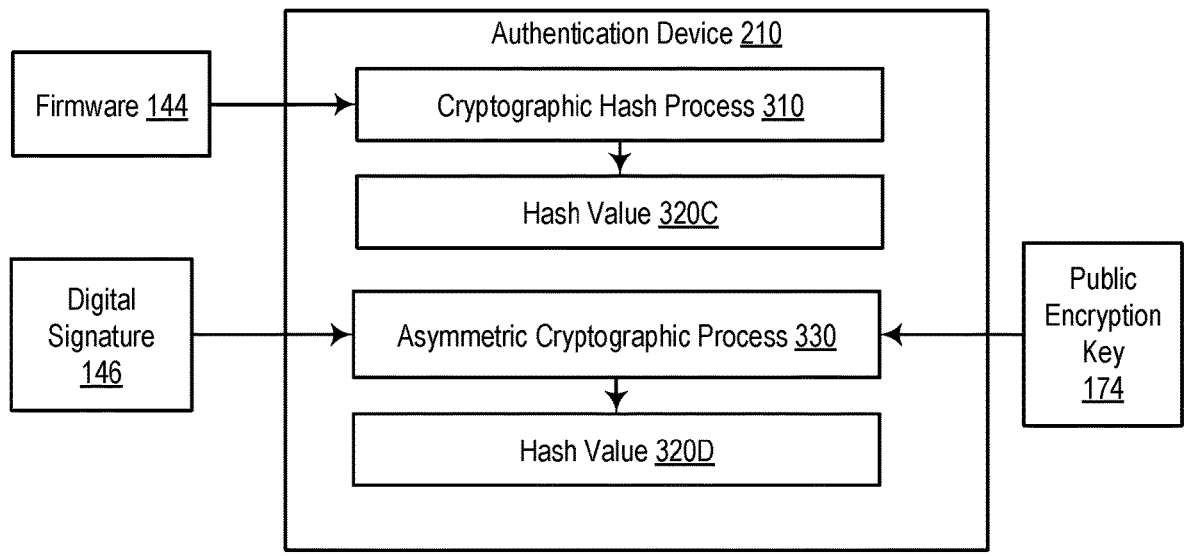
FIG. 3C illustrates an example of an authentication device, according to one or more embodiments.

Turning now to FIG. 3C, an example of an authentication device is illustrated, according to one or more embodiments. As shown, authentication device 210 may include cryptographic hash process 310. In one or more embodiments, cryptographic hash process 310 may determine a hash value 120C from firmware 144. As shown, authentication device 210 may include asymmetric cryptographic process 330. In one or more embodiments, asymmetric cryptographic process 330 may utilize public key 174 to decrypt digital signature 146 to obtain a hash value 120D. Authentication device 210 may determine if hash value 120C matches hash value 120D. If hash value 120C matches hash value 120D, firmware 144 may be authenticated. If hash value 120C does not match hash value 120D, firmware 144 may not be authenticated.

Figure 4:
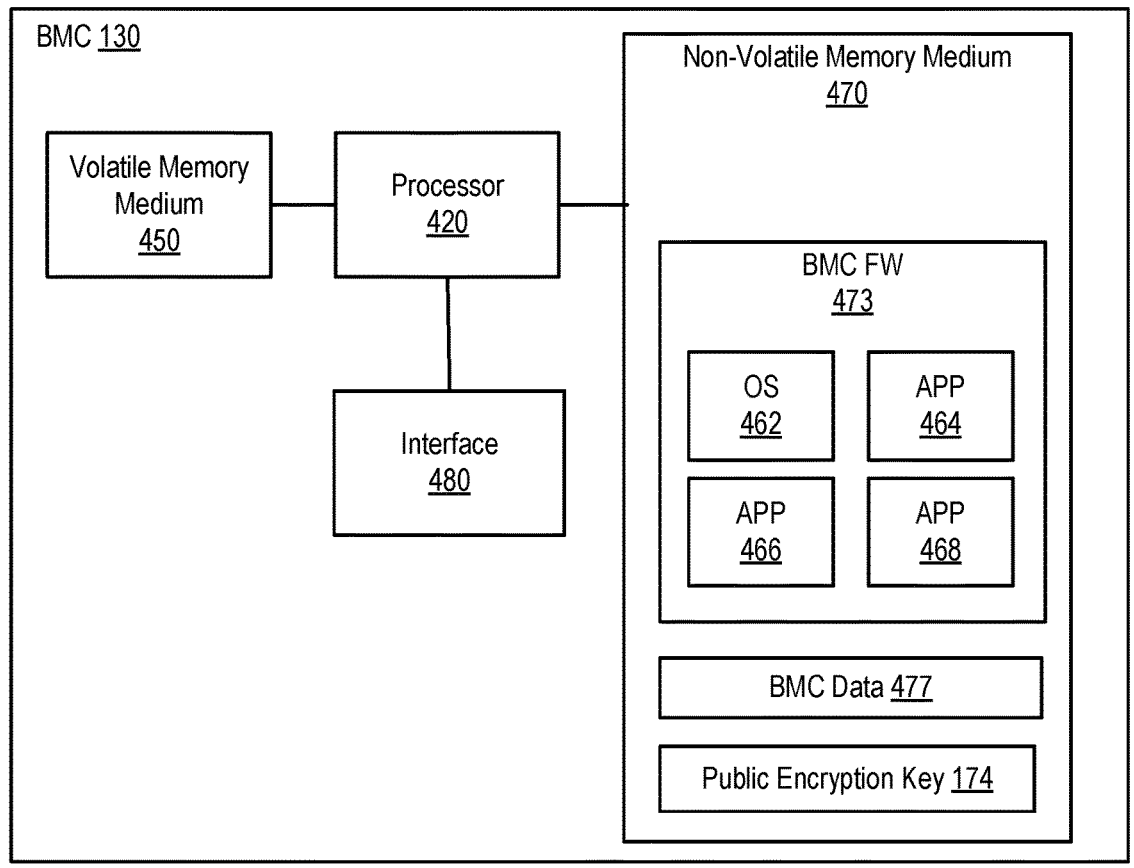
FIG. 4 illustrates an example of a baseboard management controller, according to one or more embodiments.

Turning now to FIG. 4, an example of a baseboard management controller is illustrated, according to one or more embodiments. As shown, BMC 130 may include a processor 420, a volatile memory medium 450, a non-volatile memory medium 470, and an interface 480. As illustrated, non-volatile memory medium 470 may include a BMC firmware (FW) 473, which may include an OS 462 and APPs 464-468, and may include BMC data 477. In one example, OS 462 may be or include a real-time operating system (RTOS). In a second example, OS 462 may be or include an Unix-like operating system. For instance, the Unix-like operating system may be or include Linux, FreeBSD, NetBSD, OpenBSD, Minix, Xinu, or Darwin, among others. In another example, OS 462 may be or include a portable operating system interface (POSIX) compliant operating system. As illustrated, non-volatile memory medium 470 may include a private encryption key 478. As shown, non-volatile memory medium 470 may include public encryption key 174.

In one or more embodiments, interface 480 may include circuitry that enables communicatively coupling to one or more devices. In one example, interface 480 may include circuitry that enables communicatively coupling to one or more buses. For instance, the one or more buses may include one or more buses described herein, among others. In a second example, interface 480 may include circuitry that enables one or more interrupt signals to be received. In one instance, interface 480 may include general purpose input/output (GPIO) circuitry, and the GPIO circuitry may enable one or more interrupt signals to be received and/or provided via at least one interrupt line. In another instance, interface 480 may include GPIO circuitry that may enable BMC 130 to provide and/or receive signals associated with other circuitry (e.g., diagnostic circuitry, etc.). In a third example, interface 480 may include circuitry that enables communicatively coupling to one or more networks. In one instance, interface 480 may include circuitry that enables communicatively coupling to network interface 180. In another example, interface 480 may include a network interface.

In one or more embodiments, one or more of OS 462 and APPs 464-468 may include processor instructions executable by processor 420. In one example, processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and processor 420 may execute the one or more portions of the processor instructions of the one or more of OS 462 and APPs 464-468 via volatile memory medium 450. In one or more embodiments, processor 420 may execute instructions in accordance with at least a portion of one or more systems, at least a portion of one or more flowcharts, one or more methods, and/or at least a portion of one or more processes described herein. For example, non-volatile memory medium 470 and/or volatile memory medium 450 may store instructions that may be executable in accordance with at least a portion of one or more systems, at least a portion of one or more flowcharts, at least a portion of one or more methods, and/or at least a portion of one or more processes described herein. In one or more embodiments, processor 420 may utilize BMC data 477. In one example, processor 420 may utilize BMC data 477 via non-volatile memory medium 470. In another example, one or more portions of BMC data 477 may be transferred to volatile memory medium 450, and processor 420 may utilize BMC data 477 via volatile memory medium 450.

Figure 5:
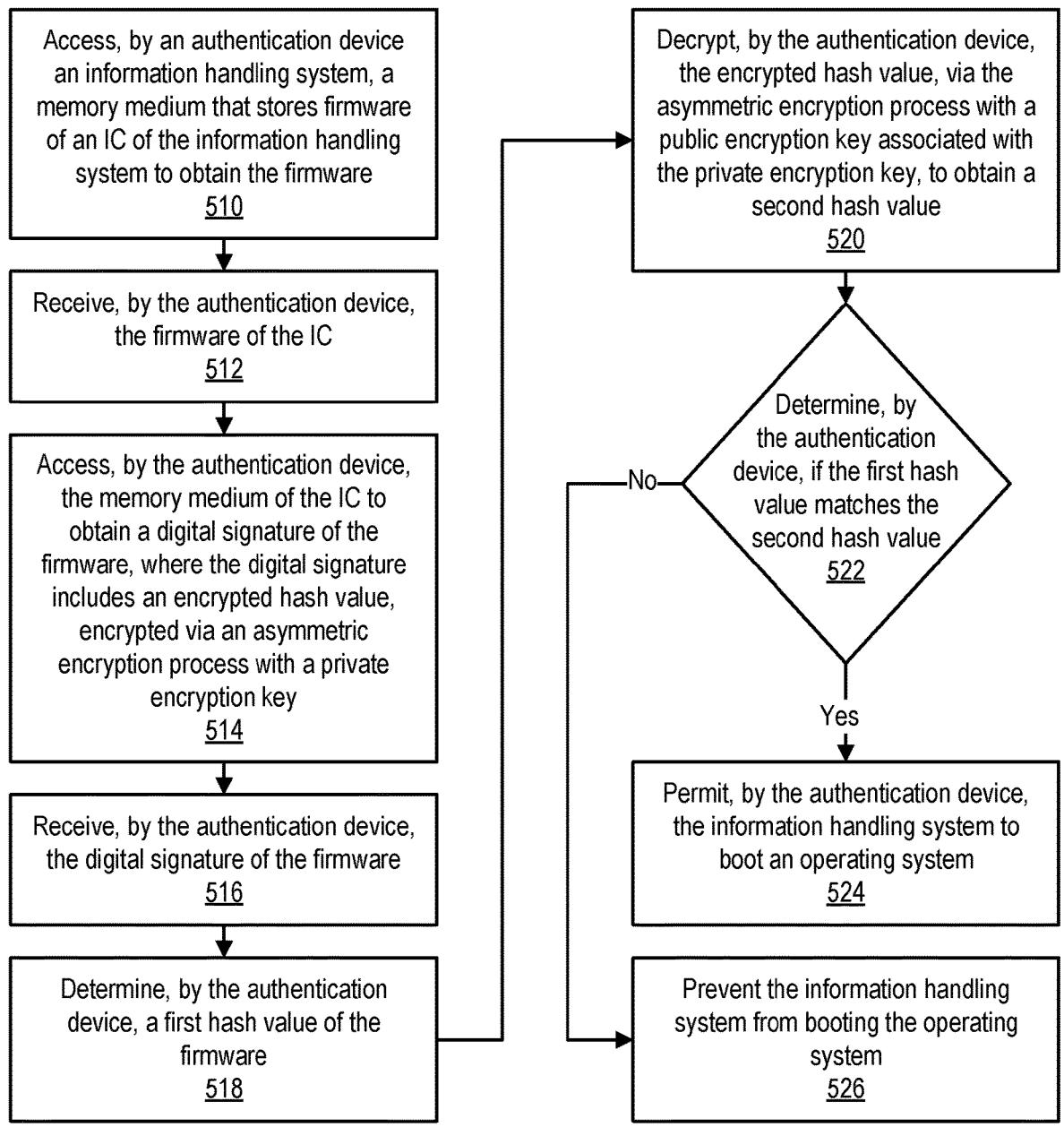
FIG. 5 illustrates an example of determining if firmware of an integrated circuit is authentic, according to one or more embodiments.

Turning now to FIG. 5, an example of determining if firmware of an integrated circuit is authentic is illustrated, according to one or more embodiments. At 510, an authentication device an information handling system may access a memory medium that stores firmware of an IC of the information handling system to obtain the firmware from the memory medium. For example, authentication device 210 of IHS 110 may access memory medium 148 to obtain firmware 144. In one instance, IC 140 may include memory medium 148. In another instance, memory medium 148 may be external to IC 140.

At 512, the authentication device may receive the firmware of the IC. For example, authentication device 210 may receive firmware 144. In one instance, authentication device 210 may receive firmware 144 from IC 140. In another instance, authentication device 210 may receive firmware 144 from memory medium 148. In one or more embodiments, receiving the firmware of the IC may include receiving the firmware via one or more direct couplings. For example, authentication device 210 may receive firmware 144 from IC 140 via direct couplings 240A-240D. In one or more embodiments, receiving the firmware of the IC from the IC may include receiving the firmware via a bus shared with at least one component of the information handling system other than the IC and the authentication device. For example, authentication device 210 may receive firmware 144 via bus 220. For instance, bus 220 may be shared with component 230, as illustrated in FIG. 2A. In one or more embodiments, receiving the firmware of the IC from the IC may include receiving the firmware via a bus not shared with at least one component of the information handling system other than the IC and the authentication device. For example, authentication device 210 may receive firmware 144 via bus 220, illustrated in FIGS. 2C and 2E.

At 514, the authentication device may access the memory medium to obtain a digital signature of the firmware, where the digital signature includes an encrypted hash value, encrypted via an asymmetric encryption process with a private encryption key. For example, authentication device 210 may access memory medium 148 to obtain digital signature 146 of firmware 144, where digital signature 146 includes an encrypted hash value, encrypted via an asymmetric encryption process with private encryption key 340.

At 516, the authentication device may receive the digital signature of the firmware. In one example, authentication device 210 may receive digital signature 146 of firmware 144 from IC 140. In another example, authentication device 210 may receive digital signature 146 of firmware 144 from memory medium 148. In one or more embodiments, receiving the digital signature may include receiving the digital signature via the one or more direct couplings. For example, authentication device 210 may receive digital signature 146 of firmware 144 from IC 140 via direct couplings 240A-240D. In one or more embodiments, receiving the digital signature of the IC from the IC may include receiving the digital signature via a bus shared with at least one component of the information handling system other than the IC and the authentication device. For example, authentication device 210 may receive digital signature 146 via bus 220. For instance, bus 220 may be shared with component 230, as illustrated in FIG. 2A. In one or more embodiments, receiving the digital signature from the IC may include receiving the firmware via a bus not shared with at least one component of the information handling system other than the IC and the authentication device. For example, authentication device 210 may receive digital signature 146 via bus 220, illustrated in FIGS. 2C and 2E.

At 518, the authentication device may determine a first hash value of the firmware. For example, authentication device 210 may determine hash value 320D of firmware 144. For instance, authentication device 210 may utilize cryptographic hash process 310 to determine hash value 320D of firmware 144. In one or more embodiments, authentication device 210 may utilize a one-way hash function to determine a first hash value of firmware 144.

At 520, the authentication device may decrypt the encrypted hash value, via the asymmetric encryption process with a public encryption key associated with the private encryption key, to obtain a second hash value. For example, authentication device 210 may decrypt the encrypted hash value, via asymmetric encryption process 330 with public encryption key 174 associated with private encryption key 340, to obtain hash value 320D. In one or more embodiments, private encryption key 340 and public encryption key 174 may be asymmetric encryption keys. In one example, data encrypted via private encryption key 340 may be decrypted via public encryption key 174. In another example, data encrypted via public encryption key 174 may be decrypted via private encryption key 340. In one or more embodiments, public encryption key 174 may be generated from private encryption key 340.

At 522, the authentication device may determine if the first hash value matches the second hash value. For example, authentication device 210 may determine if hash value 320C matches hash value 320D. If the first hash value matches the second hash value, the authentication device may permit the information handling system to boot an operating system, at 524. For example, authentication device 210 may permit IHS 110 to boot OS 162. If the first hash value does not match the second hash value, the authentication device may prevent the information handling system from booting the operating system, 526. For example, authentication device 210 may prevent IHS 110 from booting OS 162.

In one or more embodiments, if the first hash value does not match the second hash value, the authentication device may log information that indicates that the firmware of the device was not authenticated. In one example, the authentication device may log the information. In a second example, the authentication device may provide an alert. In one instance, the alert may be provided via light emissions (e.g., light emissions from a light emitting diode (LED)). In another instance, the alert may be provided via a user interface of a power-on self-test (POST) or via a user interface of an OS, among others. In another example, the authentication device may provide a message to another information handling system. For instance, the authentication device may provide the message to the other information handling system via a network.

In one or more embodiments, if the first hash value does not match the second hash value, new firmware may be installed to a memory medium associated with the IC. For example, firmware 144B may be installed to memory medium 148. In one instance, authentication device 210 may install firmware 144B to memory medium 148. In another instance, BMC 130 may install firmware 144B to memory medium 148.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer system, comprising:
at least one processor; and
a first memory medium, coupled to the at least one processor, that stores an operating system and at least one application executable by the at least one processor;
an integrated circuit (IC) that includes a second memory medium, different from the first memory medium, which stores firmware of the IC and a digital signature of the firmware; and
an authentication device;
wherein the authentication device is configured to:
  access the second memory medium to obtain the firmware;
  receive the firmware from the second memory medium;
  access the second memory medium to obtain the digital signature of the firmware, wherein the digital signature includes an encrypted hash value, encrypted via an asymmetric encryption process with a private encryption key;
  receive the digital signature of the firmware from the second memory medium;
  determine a first hash value of the firmware;

decrypt the encrypted hash value, via the asymmetric encryption process with a public encryption key associated with the private encryption key, to obtain a second hash value;

determine if the first hash value matches the second hash value;

if the first hash value matches the second hash value, permit the computer system to boot the operating system; and if the first hash value does not match the second hash value, i) prevent the computer system from booting the operating system, and ii) install new firmware, differing from the previously stored firmware, at the second memory medium.

2. The computer system of claim 1, wherein the authentication device includes the at least one processor, a platform controller hub of the computer system, a baseboard management controller of the computer system, or a microcontroller of the computer system.

3. The computer system of claim 2,
wherein the authentication device includes the baseboard management controller or the microcontroller; and
wherein the baseboard management controller or the microcontroller stores the public encryption key.

4. The computer system of claim 2, further comprising:
a non-volatile memory medium;
wherein the non-volatile memory medium stores the public encryption key;
wherein the authentication device includes the at least one processor or the platform controller hub; and
wherein the authentication device is further configured to:
access the non-volatile memory medium to obtain the public encryption key; and
receive the public encryption key from the non-volatile memory medium.

5. The computer system of claim 1, wherein the IC includes a complex programmable logic device (CPLD).

6. The computer system of claim 1,
further comprising a bus shared with at least one component of the computer system other than the IC and the authentication device;
wherein the bus includes an inter-integrated circuit ($I^2C$) bus, a serial peripheral interface (SPI) bus, a low pin count (LPC) bus, an enhanced serial peripheral interface (eSPI) bus, a universal serial bus (USB), or a system management bus (SMBus); and
wherein, to receive the firmware of the IC, the authentication device is further configured to receive the firmware via the bus.

7. The computer system of claim 1,
further comprising a bus shared with at least one component of the computer system other than the IC and the authentication device;
wherein the bus includes an inter-integrated circuit ($I^2C$) bus, a serial peripheral interface (SPI) bus, a low pin count (LPC) bus, an enhanced serial peripheral interface (eSPI) bus, a universal serial bus (USB), or a system management bus (SMBus); and
wherein, to receive the digital signature, the authentication device is further configured to receive the digital signature via the bus.

8. A method, comprising:
accessing, by an authentication device of a computer system, a first memory medium of an integrated circuit (IC) of the computer system to obtain firmware of the IC;

receiving, by the authentication device, the firmware of the IC from the first memory medium;

accessing, by the authentication device, the first memory medium to obtain a digital signature of the firmware, wherein the digital signature includes an encrypted hash value, encrypted via an asymmetric encryption process with a private encryption key;

receiving, by the authentication device, the digital signature of the firmware from the first memory medium;

determining, by the authentication device, a first hash value of the firmware;

decrypting, by the authentication device, the encrypted hash value, via the asymmetric encryption process with a public encryption key associated with the private encryption key, to obtain a second hash value;

determining, by the authentication device, if the first hash value matches the second hash value;

if the first hash value matches the second hash value, permitting, by the authentication device, the computer system to boot an operating system stored via a second memory medium of the computer system, different from the first memory medium; and if the first hash value does not match the second hash value, i) preventing, by the authentication device, the computer system from booting the operating system, and ii) installing new firmware, differing from the previously stored firmware, at the second memory medium.

9. The method of claim 8, wherein the authentication device includes a processor of the computer system, a platform controller hub of the computer system, a baseboard management controller of the computer system, or a microcontroller of the computer system.

10. The method of claim 9,
wherein the authentication device includes the baseboard management controller or the microcontroller; and
wherein the baseboard management controller or the microcontroller stores the public encryption key.

11. The method of claim 9,
wherein a non-volatile memory medium of the computer system stores the public encryption key; and
wherein the authentication device includes the processor or the platform controller hub;
the method further comprising:
accessing, by the authentication device, the non-volatile memory medium of the computer system to obtain the public encryption key; and
receiving, by the authentication device, the public encryption key from the non- volatile memory medium of the computer system.

12. The method of claim 8, wherein the IC includes a complex programmable logic device (CPLD).

13. The method of claim 8,
wherein the receiving the firmware of the IC includes receiving the firmware via a bus shared with at least one component of the computer system other than the IC and the authentication device;
wherein the bus includes an inter-integrated circuit ($I^2C$) bus, a serial peripheral interface (SPI) bus, a low pin count (LPC) bus, an enhanced serial peripheral interface (eSPI) bus, a universal serial bus (USB), or a system management bus (SMBus).

14. The method of claim 8,
wherein the receiving the digital signature includes receiving the digital signature via a bus shared with at least one component of the computer system other than the IC and the authentication device;

wherein the bus includes an inter-integrated circuit (I²C) bus, a serial peripheral interface (SPI) bus, a low pin count (LPC) bus, an enhanced serial peripheral interface (eSPI) bus, a universal serial bus (USB), or a system management bus (SMBus).

15. An authentication device of a computer system, comprising:
a processor; and
a first memory medium, coupled to the processor, that stores instructions executable by the processor, which when executed by the processor, cause the authentication device to:
 access a second memory medium of an integrated circuit (IC) of the computer system, to obtain firmware of the IC;
 receive the firmware from the second memory medium;
 access the second memory medium of the IC to obtain a digital signature of the firmware, wherein the digital signature includes an encrypted hash value, encrypted via an asymmetric encryption process with a private encryption key;
 receive the digital signature of the firmware from the second memory medium;
 determine a first hash value of the firmware;
 decrypt the encrypted hash value, via the asymmetric encryption process with a public encryption key associated with the private encryption key, to obtain a second hash value;
 if the first hash value matches the second hash value, permit the computer system to boot an operating system stored via a third memory medium of the computer system, different from the first memory medium; and
 if the first hash value does not match the second hash value, i) prevent the computer system from booting the operating system, and ii) install new firmware, differing from the previously stored firmware, at the second memory medium.

16. The authentication device of claim 15,
wherein the authentication device includes a baseboard management controller or a microcontroller; and
wherein the baseboard management controller or the microcontroller stores the public encryption key.

17. The authentication device of claim 16,
wherein a non-volatile memory medium of the computer system stores the public encryption key; and
wherein the processor of the authentication device includes a processor of the computer system or a platform controller hub of the computer system;
wherein the authentication device is further configured to:
 access the non-volatile memory medium to obtain the public encryption key; and
 receive the public encryption key from the non-volatile memory medium.

18. The authentication device of claim 15, wherein the IC includes a complex programmable logic device (CPLD).

19. The authentication device of claim 15,
further comprising a bus shared with at least one component of the computer system other than the IC and the authentication device;
wherein the bus includes an inter-integrated circuit (I²C) bus, a serial peripheral interface (SPI) bus, a low pin count (LPC) bus, an enhanced serial peripheral interface (eSPI) bus, a universal serial bus (USB), or a system management bus (SMBus); and
wherein, to receive the firmware of the IC, the authentication device is further configured to receive the firmware via the bus.

20. The authentication device of claim 15,
further comprising a bus shared with at least one component of the computer system other than the IC and the authentication device;
wherein the bus includes an inter-integrated circuit (I²C) bus, a serial peripheral interface (SPI) bus, a low pin count (LPC) bus, an enhanced serial peripheral interface (eSPI) bus, a universal serial bus (USB), or a system management bus (SMBus); and
wherein, to receive the digital signature, the authentication device is further configured to receive the digital signature via the bus.

* * * * *